United States Patent [19]

Obidniak

[11] Patent Number: 5,786,645
[45] Date of Patent: Jul. 28, 1998

[54] MOTOR-GENERATOR USING PERMANENT MAGNETS

[76] Inventor: Louis Obidniak, 3115 Ramesay, Duvernay Laval, Canada, H7E 2J6

[21] Appl. No.: 548,596
[22] PCT Filed: Apr. 29, 1993
[86] PCT No.: PCT/CA94/00241
  § 371 Date: Oct. 25, 1995
  § 102(e) Date: Oct. 25, 1995
[87] PCT Pub. No.: WO94/26018
  PCT Pub. Date: Nov. 10, 1994

[30] Foreign Application Priority Data

Apr. 29, 1993 [CA] Canada ................ 2095203

[51] Int. Cl.⁶ .................. H02K 25/00; H02K 47/00
[52] U.S. Cl. .................. 310/68 R; 310/254; 310/268; 318/138
[58] Field of Search .................. 318/254, 439, 318/132, 138; 310/68 R

[56] References Cited

U.S. PATENT DOCUMENTS

| | | | |
|---|---|---|---|
| 3,560,820 | 2/1971 | Unnewehr | 318/138 |
| 3,714,533 | 1/1973 | Unnewehr | 318/138 |
| 3,748,554 | 7/1973 | McDonald William | 318/138 |
| 4,064,442 | 12/1977 | Garron | 318/254 |
| 4,459,519 | 7/1984 | Erdman | 318/254 |
| 4,584,506 | 4/1986 | Kaszmann | 318/254 |
| 4,808,868 | 2/1989 | Roberts | 310/68 R |
| 5,355,069 | 10/1994 | Bahn | 318/701 |

FOREIGN PATENT DOCUMENTS

| | | |
|---|---|---|
| 0042884 | 1/1982 | European Pat. Off. . |
| 0043885 | 1/1982 | European Pat. Off. . |
| 0404299 | 12/1990 | European Pat. Off. . |
| 2112768 | 7/1972 | France . |
| 2231143 | 12/1974 | France . |
| 2050525 | 1/1981 | United Kingdom . |
| 2069768 | 8/1981 | United Kingdom . |
| 02188 | 5/1970 | WIPO . |

*Primary Examiner*—Thomas M. Dougherty
*Assistant Examiner*—B. Mullins
*Attorney, Agent, or Firm*—Merchant, Gould, Smith, Edell, Welter & Schmidt, P.A.

[57] ABSTRACT

An electric motor-generator has a rotor (1), a stator including soft ferromagnetic cores (3, 5) and coils (4, 6), permanent magnets (2) having pole axes in a plane radial to an axis of rotation of the rotor, means for mounting the magnets, the cores and coils to the rotor and stator, and means for energizing the coils. The rotor is caused to rotate by attraction of the magnets to the cores (5) as the magnets and cores approach one another, an opposite attraction force between the magnets and the cores being neutralizeable by energizing the coils (6) as the magnets and cores move apart. The cores are C-shaped and a magnetic circuit is formed when the magnets and cores are in proximate alignment.

6 Claims, 7 Drawing Sheets

START REPULSION

REPULSION

CAPACITOR CHARGING

OSCILLATOR CIRCUIT OPEN

MOTOR-GENERATOR USING PERMANENT MAGNETS

FIELD OF THE INVENTION

The present invention relates to an electric motor-generator. In particular, the invention relates to a motor-generator using permanent magnets and soft ferromagnetic cores.

BACKGROUND OF THE INVENTION

It is a well-known principle that a permanent magnet will induce a magnetic field in a soft ferromagnetic element or core resulting in an attraction force between the core and the permanent magnet. It is also known to construct electric motor-generators in which permanent magnets interact with electromagnetic coils. In the case of a motor, current is supplied to the coils to propel the motor. In the case of a generator, the current induced in the coil as a result of the varying magnetic field resulting from movement of the permanent magnet with respect to the coil is withdrawn from the generator for useful purposes and is the product of work applied to the generator.

The efficiency of known motors is substantially less than perfect due to electrical losses and magnetic losses.

The magnetic circuits established between the permanent magnets and coils are not conventionally closed magnetic circuits when the magnet and coils are in proximate alignment.

Electrical current is also applied to conventional motors in a continuous alternating cycle or in a piecewise continuous fashion.

SUMMARY OF THE INVENTION

It is accordingly an object of the present invention to provide an electric motor-generator in which natural attraction between permanent magnets and soft ferromagnetic cores is used to provide motive force. It is also an object of the present invention to provide a motor-generator in which a magnetic circuit is completed when the permanent magnets and cores are in proximate alignment. It is a further object of the present invention to provide a motor-generator in which a repulsion current provided to a coil associated with the core need only be applied for a fraction of the motor's cycle.

According to the invention there is provided an electric motor-generator comprising a rotor having an axis of rotation, a stator, at least one permanent magnet having a pole axis in a plane radial to the rotation axis of the rotor, at least one soft ferromagnetic attraction core through which poles of the magnet can pass, the magnet and the attraction core forming a magnetic circuit when in proximate alignment, at least one coil associated with the attraction core for producing a magnetic field in the attraction core for assisting motive passage of the magnet through the core, means for mounting the magnet, the attraction core and the coil to the rotor and the stator, and means for energizing the coil. In this way, the rotor is caused to rotate by attraction of the magnet to the attraction core as the magnet and attraction core approach one another, an opposite attraction force between the magnet and the attraction core being neutralizeable by energizing the coil as the magnet and the attraction core move apart.

It is to be understood that in the present description, a rotor can include an endless belt type system. The energizing means can include means for storing a current induced as the magnet approaches the proximate alignment position with the core, the stored current being redelivered to the coil at the appropriate time for reducing or breaking an attraction force between the core and the magnet.

The motor-generator may comprise a number of permanent magnets and cores, provided that the magnetic fields between adjacent cores and magnets do not interfere with one another. It is not necessary to have as many cores as magnets. It is possible to use the coils associated with the cores for assisting in the generation of motor force in the case of a motor and also for extracting electrical energy in the case of a generator.

BRIEF DESCRIPTION OF THE DRAWINGS

The invention will be better understood by way of the following description of a preferred embodiment of the invention with reference to the appended drawings in which.

DETAILED DESCRIPTION OF THE PREFERRED EMBODIMENT

Figure 1:
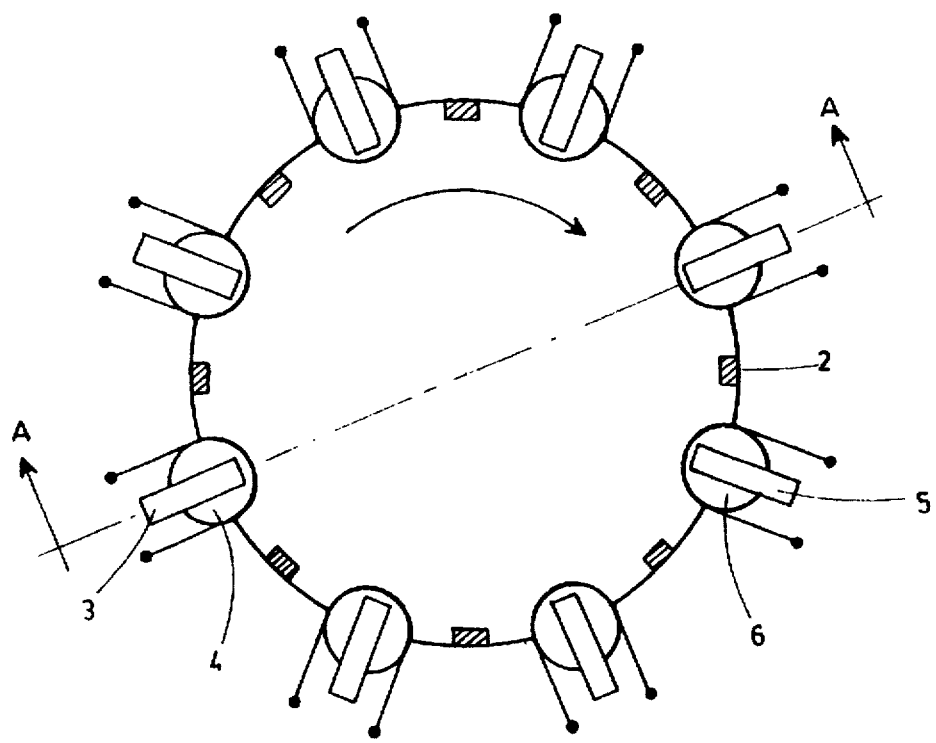
FIG. 1 is a plan view of a preferred embodiment.
Figure 2:
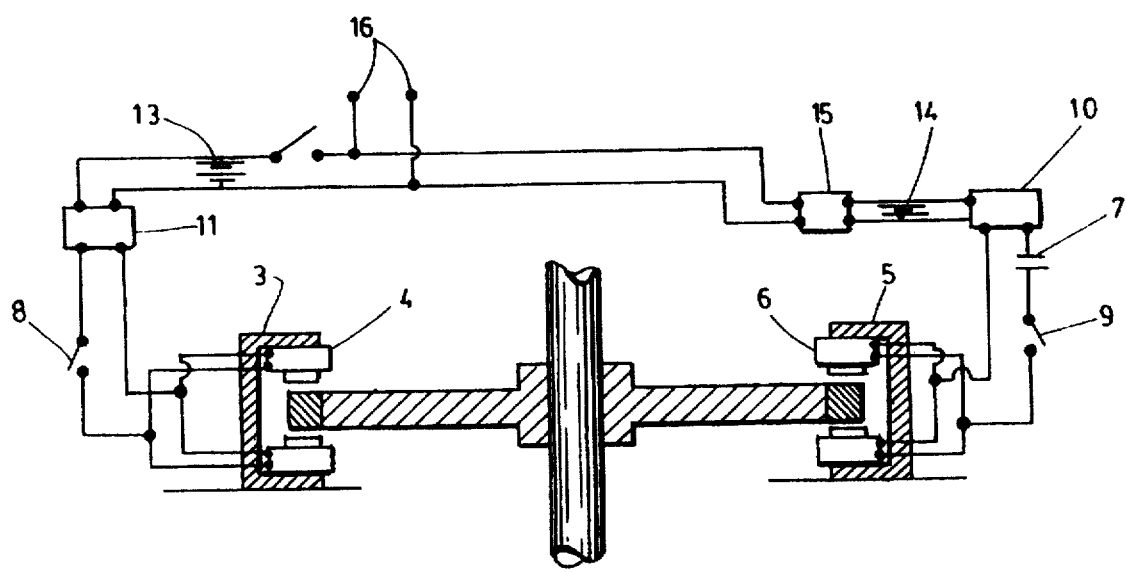
FIG. 2 is a cross-sectional view about plane A—A of FIG. 1 also indicating an electrical block diagram of the associated electrical circuit.

In the preferred embodiment as illustrated in FIGS. 1 and 2, a rotor (1) is provided with eight rare earth permanent magnets (2) having a pole axis parallel to an axis of rotation of the rotor shaft. Mounted on a fixed base around the circumference of rotor (1) are a plurality of generating cores (3) and associated generating coils (4), as well as a plurality of attraction cores (5) and associated coils (6). In the preferred embodiment, the cores (3) and (5) and coils (4) and (6) are of a similar structure and by easily adapting the electronic circuitry, it is possible to operate the motor-generator either as a pure generator or a pure electric motor. The preferred embodiment illustrates a hybrid model in which both generator coils and attraction coils are present. On the attraction core and coil side, there is associated a switch (9), a passive storage capacitor (7), a switching unit (10), a battery (14) and a battery charger (15). On the generating core and coil side, there is provided a switch (8), a controller switching unit (11), battery (13) and output or input connection (16).

Figure 3:
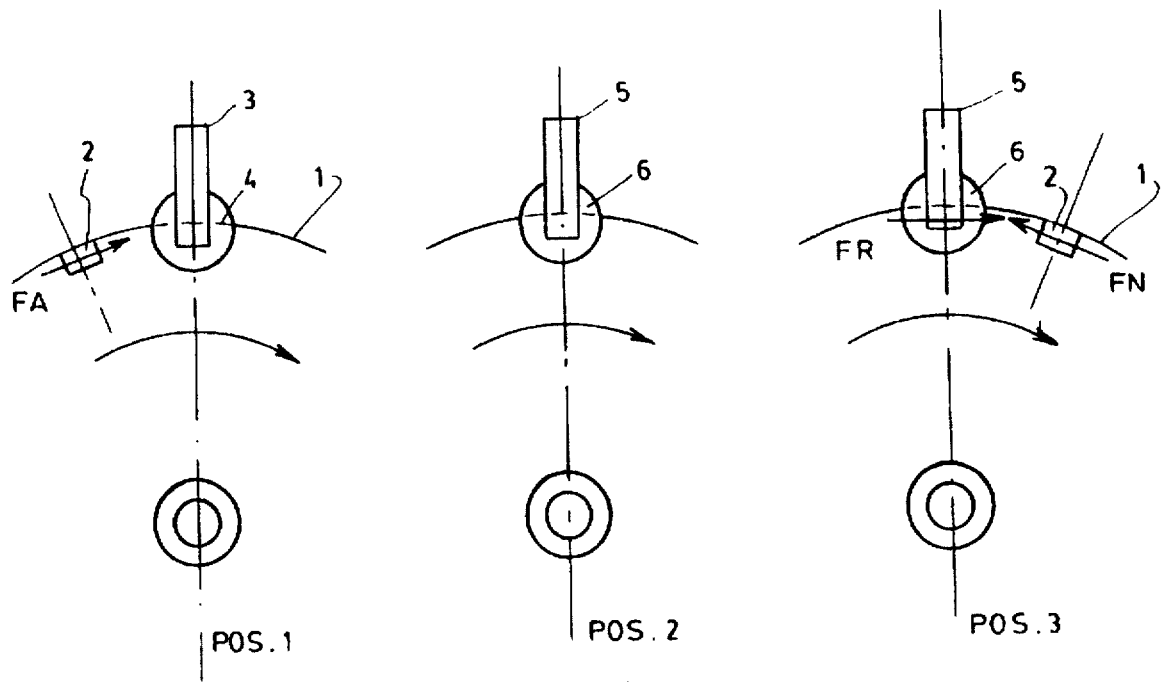
FIG. 3 illustrates a partial plan view of the invention in three different rotor positions.
Figure 4:
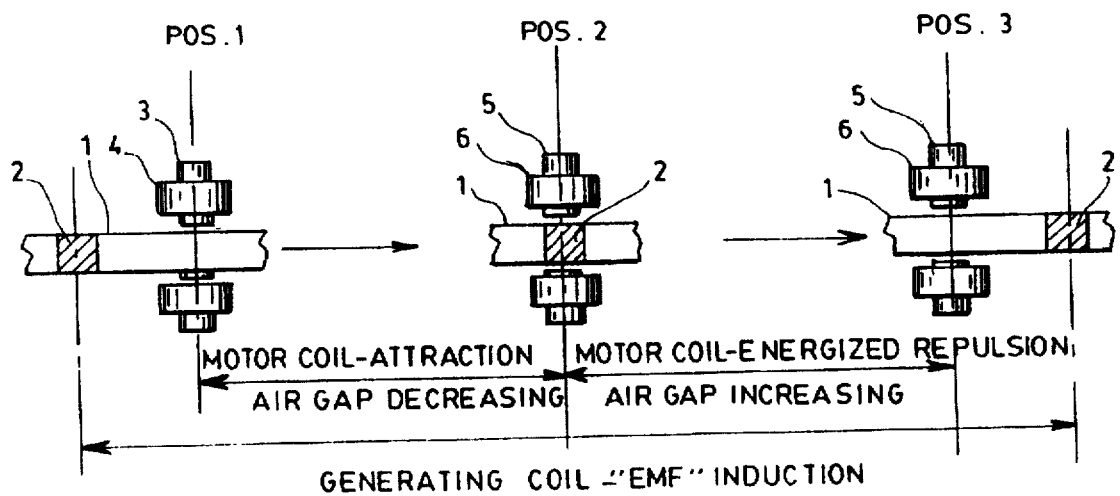
FIG. 4 is a break away end view of three positions of the invention corresponding to FIG. 3.

With reference to FIGS. 3 and 4, the operation of the attraction core and coil will be illustrated. In position (1) in the figures, the core and coil, whether it be of a generating kind or the attraction/motor kind is attracted to permanent magnet (2) in such a way that the magnet is drawn to the core as the rotor turns. A magnetic circuit in the C-shaped core is formed and the increase in the magnetic field induces an "emf" in the coils (4) which may be stored or used as power output. In FIG. 2, the core and permanent magnet are in proximate alignment and the coil (6) associated with the attraction core (5) is provided with a short-lived burst of current to repel the permanent magnet as the core and permanent magnet separate until position (3) is reached. It is important to note that the burst of current is short-lived and the efficiency of current consumption in the coils (6) has been found to increase with frequency of rotation.

Figure 5:
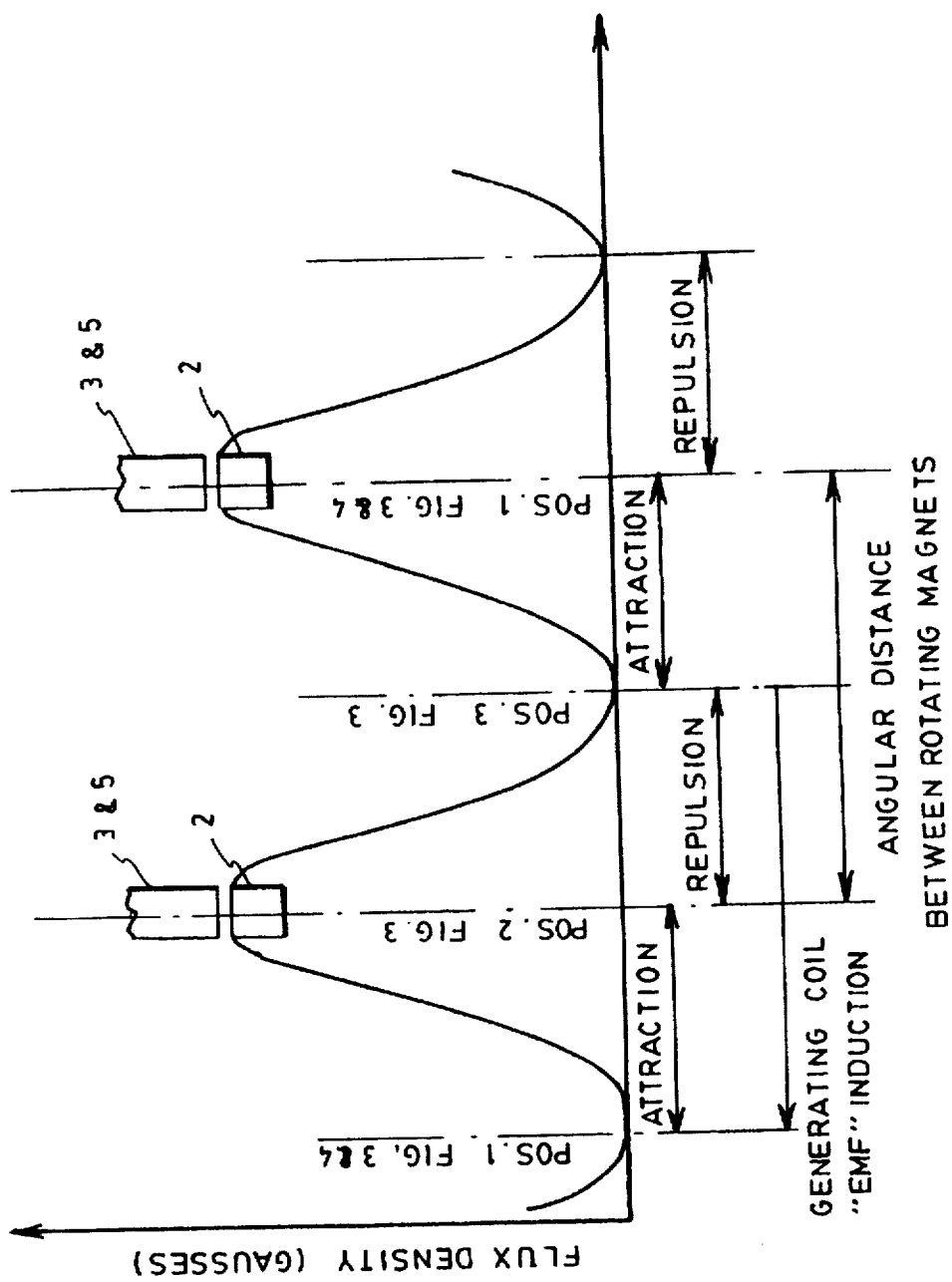
FIG. 5 is a graph of flux density as a function of angular position.

FIG. 5 shows the alternating flux density in the magnetic circuits due to rotation of the magnets in relation to the fixed iron cores of the generating coil (4) and the coil (6). It is worth pointing out that it is not important to the basic working principle of the invention whether the cores are part of the stator or a part of the rotor so long as there is relative movement between the permanent magnets and the cores and that there is a magnetic circuit formed when the two are in proximate alignment. Furthermore, the pole axis of the permanent magnet need not be parallel to the axis of rotation but could be any axis in a plane radial to the axis of rotation. The rotor may also comprise an endless belt. In the preferred embodiment, there is no need for brushes of slip rings as the electronic circuitry is entirely mounted on the stator.

Figure 6:
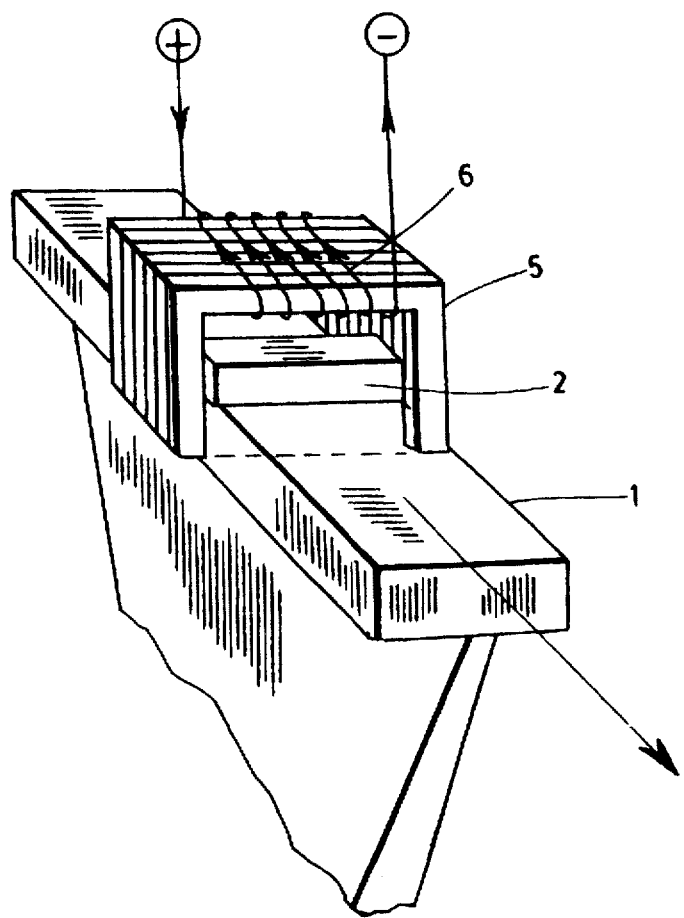
FIG. 6 is a detailed view of the permanent magnet and soft ferromagnetic core according to the preferred embodiment.

FIG. 6 is a detailed view of the magnetic circuit and the coil (6) used to break the magnetic circuit for repulsion purposes. As can be seen, core (5) is made from a plurality of insulated soft ferromagnetic laminates. The soft ferromagnetic sheets are preferably stamped from unstressed sheet metal in order to improve the magnetic hysteresis loop. As shown, by flowing an electric current through coil (6) the direction of magnetic flux in the core (5) is reversed to ease separation between the soft ferromagnetic core (5) and permanent magnet (2) as rotor (1) advances. The reversal of flux is also referred to as neutralizing.

Figure 7:
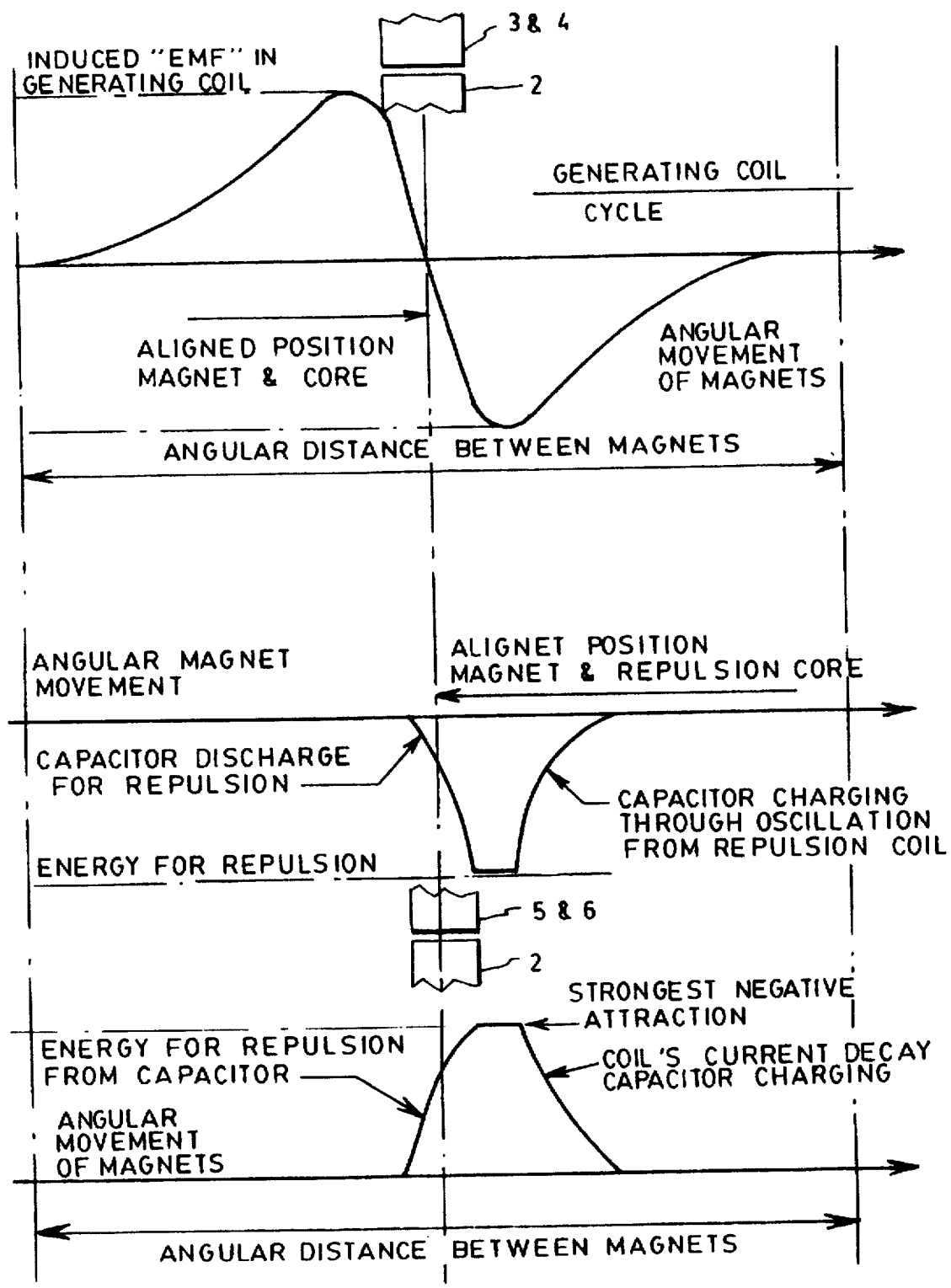
FIG. 7 shows plots of induced "emf" in the generating coil, the capacitor discharge and the coil current, all as a function of angular position.
Figure 8A:
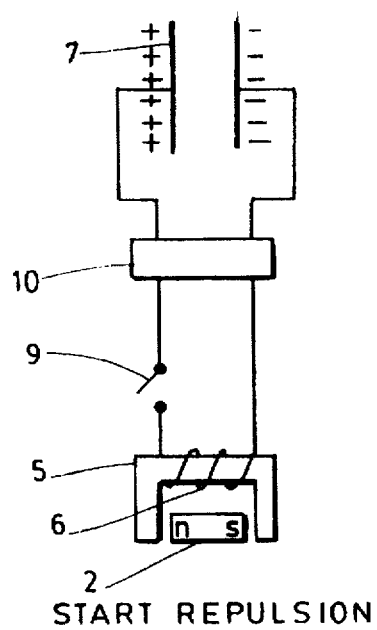
FIGS. 8a through 8d illustrate the energizing means connected to the coil associated with the soft ferromagnetic attraction core in four different states of operation.
Figure 8B:
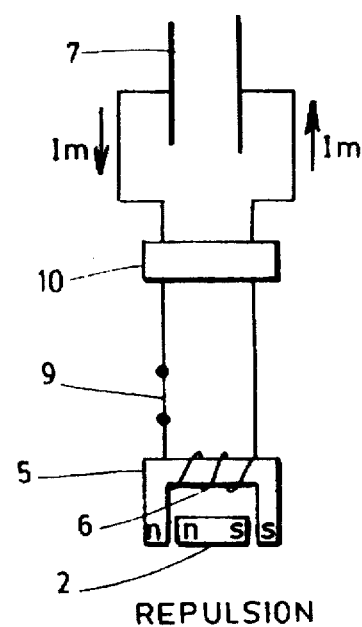
Figure 8C:
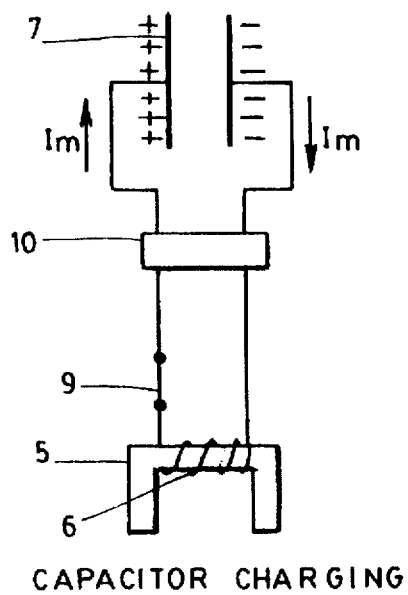
Figure 8D:
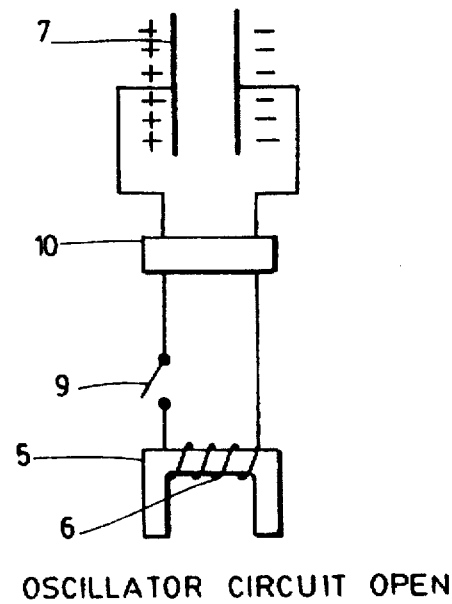

With reference to FIGS. 7 and 8, the operation of the motor component of the electronic circuitry will be described. In FIG. 8a there is shown the circuit and core in the position corresponding to position 2 illustrated in FIGS. 3 and 4 in which the permanent magnet (2) is in proximate alignment with core (5). At this point, as illustrated in FIG. 7, the induced "emf" or voltage in the coil (6) is zero. The magnetic flux in the core (5) is in a complete circuit in accordance with the magnetic field emanating from permanent magnet (2). At or preferably shortly before this point, a current is fed through coil (6) as illustrated in FIG. 8b by closing switch (9) with the result that the magnetic circuit is broken and a state of neutrality or even repulsion exists between core (5) and permanent magnet (2). The current required for repulsion drains capacitor (7). As illustrated in the plot of repulsion coil current in FIG. 7, when the capacitor discharge is over, further current is supplied from battery (14) through controller (10) to continue supplying current for a brief period of time until magnet (2) is sufficiently remote from core (5). At this point, the decay in the magnetic field in the core (5) produces a current in coil (6) which is connected through switching controller (10) to recharge capacitor (7). Once this has been done, switch (9) is opened and core (5) is ready for the next cycle period.

Although in the preferred embodiment, it is illustrated that a capacitor is used to store energy from the decay in the magnetic field in the core and also to provide current to the coil to initiate repulsion, the switching unit (10) can be used in a variety of different arrangements to meet the objectives of the present invention. For example, the repulsion current could come from another generating coil from the same stator or from a parallel stator. The current obtained from coil (6) as the magnetic field decays in core (5) could be transferred through unit (10) to another coil (6) requiring repulsion current. It is also possible to provide more than one capacitor (7) each connected to unit (10) for charging and discharging in series or in parallel in order to provide the most efficient energy storage and discharge system. As can be appreciated, if coil (6) is fed only enough current to neutralize the magnetic circuit so that very little repulsion takes place as magnet (2) moves away from core (5) and such that little magnetic flux remains in core (5) as magnet (2) moves farther and farther away from core (5), there is little or no magnetic flux energy left in core (5) to recapture by coil (6) in the step illustrated in FIG. 8c and therefore this step may not take place. However, in the preferred embodiment, sufficient current is fed to coil (6) to provide for good repulsion.

Figure 9:
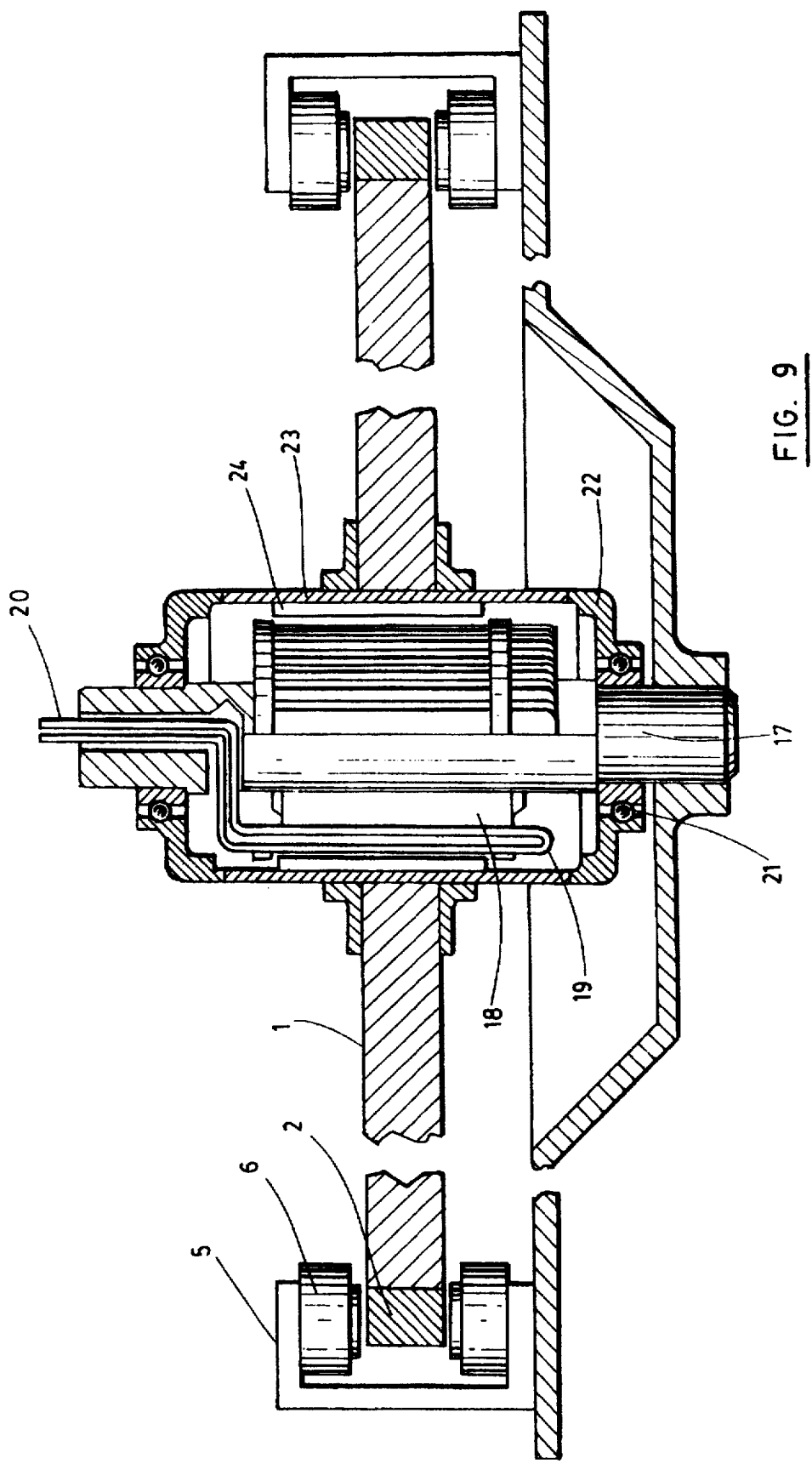
FIG. 9 illustrates a variant of the invention in which a generating coil is mounted in a hub of the rotor.

As illustrated in FIG. 9, there is shown a hub (23) which houses magnets (24) and is rotatably mounted onto a fixed shaft (17) by bearings (21). As rotor (2) rotates, stationary coils (19) are subjected to variable magnetic flux resulting from magnets (24) and have an alternating "emf" induced in them. Conductors (20) are used to remove power from stationary coils (19) along stationary shaft (17). The alternative embodiment of FIG. 9 can provide a compact motor-generator in which the circumferential coils can all be attraction cores and associated coils.

As can be appreciated, the motor-generator of the present invention uses natural attraction between permanent magnets and soft ferromagnetic cores for motor power. The coil energizing means provides the necessary neutralizing or repulsion current to the coils (6) associated with the attraction cores (5). Although not explicitly illustrated in the drawings, it is to be understood that the timing of the switches (9) and/or (8) as well as control units (10) and (11) are to be appropriately controlled. For this purpose, Hall effect sensors detecting position of the permanent magnets (2) as they rotate on rotor (2) can be used for providing timing signals, however, circuitry can be provided to detect position of the magnets by measuring coil voltage. Alternatively, optical encoding on the rotor or shaft or low friction mechanical switching can be used for timing control purposes.

I claim:

1. An electric motor-generator comprising:
a rotor (1) having a rotation axis;
a plurality of permanent magnets (2) mounted on said rotor (1), said magnets (2) being equally spaced apart and having a pole axis in a plane radial to said rotation axis;
at least one generating core (3) which is fixedly mounted with respect to said rotor and through which said magnets can pass;
at least one generating coil (4) associated to each generating core (3), said generating coil (4) cooperating with said magnets (2) to generate output power;
at least one soft ferromagnetic attraction core (5) which is fixedly mounted with respect to said rotor and through which said magnets can also pass, said at least one attraction core (5) attracting said magnets (2) when they approach one another and causing said rotor to rotate, said attraction core (5) and magnets (2) forming together a magnetic circuit when in proximate alignment;
at least one coil (6) associated with each attraction core (5) for producing a magnetic field in said attraction core (5); and means for energizing each of said at least one coil (6) so as to neutralize the attraction force between said magnets (2) and the corresponding attraction core (5) as said magnets and core move apart, characterized in that said means for energizing each of said at least one coil (6) includes a power supply, a passive storage capacitor (7) and a switch (9) to operatively connect said power supply and said capacitor (7) to the corresponding coil (6) so that:

when each permanent magnet (2) is in proximate alignment with the corresponding attraction core (5), closing of the switch (9) causes the capacitor (7) to discharge into the coil (6), after which said power supply supplies further current to the coil (6) and thus a magnetic repulsion energy is generated in the attraction core (5) which allows said magnet (2) to move away from said attraction core (5); and when said magnet (2) continues moving away from the attraction core (5), the switch (9) is kept closed for an additional period of time to allow decay of the magnetic repulsion energy generated in said attraction core (5) to produce a current in the coil (6) which returns back to the capacitor (7) and recharges it;

whereby, in use, maximum energy efficiency and recovery are achieved.

2. The motor generator as claimed in claim 1, wherein said means for energizing each of said at least one coil (6) also includes a switching controller (10) to control the discharge and recharge of the capacitor (7).

3. The motor generator as claimed in claim 1, wherein said means for energizing each of said at least one coil (6) further includes a source of current (14) to recharge the capacitor (7) via the switching controller (10) whenever required.

4. The motor-generator as claimed in claim 1, wherein:
said magnets (2) are mounted on said rotor (1) at the periphery thereof.

5. The motor-generator as claimed in claim 4, wherein each of said core (3) and (5) is C-shaped and has a coil (4) and (6) respectively, provided at each end thereof.

6. The motor-generator as claimed in claim 1, wherein:
said rotor (1) has a hub (23);

said hub (23) houses at least one permanent magnet (24); and said rotor (1) has a mounting shaft (17) which includes at least one stationary coil (19) cooperating with said at least one magnet (24) to generate output power.

* * * * *